United States Patent [19]
Wu

[11] Patent Number: 6,137,621
[45] Date of Patent: Oct. 24, 2000

[54] ACOUSTIC LOGGING SYSTEM USING FIBER OPTICS

[76] Inventor: Jian-Qun Wu, 5100 FM, 1960 W., Apt. # 1408, Houston, Tex. 77069

[21] Appl. No.: 09/146,017

[22] Filed: Sep. 2, 1998

[51] Int. Cl.$^7$ .................................................. G02B 26/00
[52] U.S. Cl. ........................... 359/290; 181/102; 367/32; 367/26
[58] Field of Search ...................... 356/32, 345; 385/101; 359/290, 168; 340/854; 367/32, 26, 30; 181/102; 250/227.18

[56] References Cited

U.S. PATENT DOCUMENTS

| | | |
|---|---|---|
| 2,301,326 | 11/1942 | Reistle, Jr. . |
| 2,824,378 | 2/1958 | Stokes . |
| 2,894,200 | 7/1959 | Szasz . |
| 3,086,167 | 4/1963 | Chaney et al. . |
| 4,162,400 | 7/1979 | Pitts, Jr. . |
| 4,167,111 | 9/1979 | Spuck, III . |
| 4,226,288 | 10/1980 | Collins, Jr. . |
| 4,389,645 | 6/1983 | Wharton . |
| 4,390,974 | 6/1983 | Siems . |
| 4,442,842 | 4/1984 | Baba . |
| 4,455,869 | 6/1984 | Broussard et al. . |
| 4,594,691 | 6/1986 | Kimball et al. . |
| 4,610,006 | 9/1986 | MacDonald . |
| 4,700,803 | 10/1987 | Mallett et al. . |
| 4,703,460 | 10/1987 | Kurkjian et al. . |
| 4,829,486 | 5/1989 | Broding . |
| 4,852,067 | 7/1989 | White . |
| 4,950,883 | 8/1990 | Glenn . |
| 4,951,267 | 8/1990 | Chang et al. . |
| 4,951,677 | 8/1990 | Crowley et al. . |
| 4,996,419 | 2/1991 | Morey . |
| 5,007,705 | 4/1991 | Morey et al. . |
| 5,097,838 | 3/1992 | Hirooka et al. . |
| 5,361,130 | 11/1994 | Kersey et al. ............................ 356/345 |
| 5,467,212 | 11/1995 | Huber . |
| 5,493,390 | 2/1996 | Varasi et al. ................................ 356/32 |
| 5,495,547 | 2/1996 | Rafie et al. ............................... 385/101 |
| 5,497,233 | 3/1996 | Meyer . |
| 5,510,582 | 4/1996 | Birchak et al. . |
| 5,623,455 | 4/1997 | Norris . |
| 5,626,192 | 5/1997 | Connell et al. . |
| 5,675,674 | 10/1997 | Weis . |
| 5,731,550 | 3/1998 | Lester et al. . |
| 5,737,278 | 4/1998 | Frederick et al. . |
| 5,804,713 | 9/1998 | Kluth . |
| 5,808,779 | 9/1998 | Weis . |

FOREIGN PATENT DOCUMENTS

| | | |
|---|---|---|
| 0434030 | 6/1991 | European Pat. Off. . |
| 9938048 | 7/1999 | WIPO . |

*Primary Examiner*—Hezron Williams
*Assistant Examiner*—Anthony Jolly
*Attorney, Agent, or Firm*—Ware, Fressola, Van Der Sluys & Adolphson LLP

[57] ABSTRACT

The present invention relates to an acoustic logging system having a sonde for arranging in a borehole of a well such as an oil well. The sonde has at least one transmitter for providing at least one transmitter acoustic signal, and has receivers for responding to the at least one transmitter acoustic signal, for providing receiver signals containing information about properties of earth formations in the borehole. The acoustic logging system features one or more transducers, a light source, an optical fiber and a detection and management unit. The one or more transducers responds to the receiver signals from the receiver of the sonde, for providing one or more mechanical transducer forces containing information about the receiver signals. At least one transducer may be a piezoelectric or magnetostrictive transducer. The light source provides an optical signal. The optical fiber responds to the one or more mechanical transducer forces, for changing an optical parameter or characteristic of the optical signal depending on the change in length of the optical fiber, and providing a transduced optical signal containing information about the one or more mechanical transducer forces from the one or more transducers. The optical fiber is wrapped around the one or more transducers and bonded thereon. The detection and management unit has a signal processor, responds to the transduced optical signal, and provides a detection and management unit signal containing information about the properties of earth formations in the borehole.

30 Claims, 6 Drawing Sheets

FIG.5 (FIBER OPTIC ACOUSTIC SOURCE)

FIG. 6 (MULTIPLE ACOUSTIC SOURCES ON A SINGLE FIBER)

ACOUSTIC LOGGING SYSTEM USING FIBER OPTICS

BACKGROUND OF THE INVENTION

1. Technical Field

The present invention relates to a logging system for sensing and determining properties of earth formations; and more particularly to a logging system using fiber optics for sensing and transmitting data containing information about a borehole of an oil well with a sonde.

2. Description of the Prior Art

FIG. 1 shows a sonic sonde that is known in the art, and used in a logging system for sensing and determining the rock formations in the borehole of the well or the like. The sonde has a transmitter (i.e. source) for providing a transmitter acoustic signal, and has receivers for responding to the transmitter acoustic signal, for providing electrical receiver signals containing information about rock formations in the borehole.

In operation, the transmitter emits a sound pulse, and its arrival at the receivers is recorded by recording apparatus that is not shown in FIG. 1 but is well known in the art. This process is repeated at a fixed rate as the tool traverses through the borehole. Because the p-wave velocity is faster in the formation than in the borehole fluid, the first arrivals are the waves refracted in the formation at the side of the borehole wall. The receiver spacing and the p-wave velocity in the formation determine the delay between the arrival times. The delays or quantities derived from the delays are plotted as a function of borehole depth. See also U.S. Pat. No. 4,162,400, hereby incorporated by reference, which describes a fiber optic well logging tool for passing through a borehole of an oil well. See also Well Logging For Earth Scientists, Chapters 15–17, Darwin V. Ellis, Elsevier, 1987, as well as Acoustic Waves in Boreholes, Frederick L. Paillet and Chuen Hon Cheng, CRC Press, 1991, both also hereby incorporated by reference.

The acoustic receivers are made of pressure transducers. Piezoelectric or magnetostrictive materials are used to sense the pressure signal. The voltage output of the piezoelectric or the current output of the magnetostrictive varies with the pressure. Sensitive electronics built into the sonde measures the voltage or the current. The measurements are processed and sent uphole via an electrical wireline.

FIG. 1 shows an idealized situation where the sonde is in the middle of a borehole that is ideally very smooth. All current tools use an extra transmitter located on the opposite side of the receivers. Sound pulses are emitted alternately from the transmitters. The measured delays from the two oppositely traveling refracted waves are averaged. The averaged delays are less sensitive to the more irregular contour of a real borehole as well as tool tilting.

The sonde described above record only the time delay between the arrival pulses. The receiver readings as a function of time after the transmitter pulse (sonic traces) are not used, and therefore, not recorded. The only data sent through the wireline are the delays. Even at fast logging speeds, the data volume is moderate and can be transmitted through the standard 7-wire wireline whose capacity is 1 Mbit/s.

Due to the advance in processing, interpretation, and modeling, more properties of the formation, borehole, and tool performance can be obtained by using the entire receiver traces in both receivers. A 10-millisecond trace at 5 microsecond intervals consists of two thousand data points. In addition, more than two receivers are used for array processing. The data collected at each logging depth consist of thousands of measurements (numbers) as opposed to the time delay measurement (a single number). The huge data volume generated from the newer acoustic logging tools severely limits the logging speed.

Fiber optic telemetry systems have been proposed to replace the standard 7-wire cable. U.S. Pat. No. 5,495,547, hereby incorporated by reference, describes a combination fiber-optic/electrical conductor well logging cable. The combination logging cable preserves all the functionality and structural integrity of the standard 7-wire plus one or more fiber wires integrated in. Fibers provide much higher bandwidth, allowing a much faster data transmission rate. Opto-electronics are used to convert electrical signals to optical signals fed into the fiber. The receiver electronics are the same as the traditional wireline acoustic tool. The use of fiber solves the problem of data transmission capacity. The much higher data rate is achieved by using opto-electronics downhole. This increases the cost of the tool and its rate of failure.

One disadvantage of the known designs is that the sensitive electronic are disposed in the sonde and subject to very harsh conditions, including high temperatures and undesirable vibrations when passing through the borehole. These adverse conditions can limit accuracies in data measurement, as well as accelerated electronic failure.

SUMMARY OF THE INVENTION

The present invention relates to an acoustic logging system having a sonde for arranging in a borehole of a well such as an oil well. The sonde has at least one transmitter for providing at least one transmitter acoustic signal, and has receivers for responding to the at least one transmitter acoustic signal, for providing electrical receiver signals containing information about properties of earth formations in the borehole of the well.

The acoustic logging system features one or more transducers, a light source, an optical fiber and a detection and management unit.

The one or more transducers respond to the electrical receiver signals from the receiver of the sonde, for providing one or more mechanical transducer forces containing information about the electrical receiver signals. At least one transducer may be a piezoelectric or magnetostrictive transducer.

The light source provides an optical signal through the optical fiber.

The optical fiber responds to the one or more mechanical transducer forces, for changing an optical parameter or characteristic of the optical signal depending on the change in length of the optical fiber, and providing a transduced optical signal containing information about the one or more mechanical transducer forces from the one or more transducers. The optical fiber is wrapped around the one or more transducers and affixed thereon. The optical fiber may be affixed to the one or more transducers by bonding or wrapping under tension. In one embodiment, the optical fiber may have fiber Bragg Grating pairs arranged on a part thereof not bonded to the one or more transducers; and each transducer is arranged between a respective fiber Bragg Grating pair. In another embodiment, the optical fiber has a fiber Bragg Grating arranged on a part thereof bonded to the transducer. The acoustic logging system may also include a coupler-based interferometric system for sensing and determining the change in the optical parameter or characteristic of the optical signal depending on the change in length of the optical fiber. In each case, the change in length of the optical fiber causes a change in the phase or wavelength of the optical signal being transmitted or reflected through the optical fiber.

The detection and management unit has a signal processor, responds to the transduced optical signal, and provides a detection and management unit signal containing information about the properties of the earth formations in the borehole. The detection and management unit may use either a wavelength division multiplexing scheme for signal processing, a time division multiplexing scheme for signal processing or a combined wavelength and time division multiplexing scheme for signal processing.

The at least one transmitter of the sonde may be a fiber optic acoustic source having a photocell and an acoustic transducer. In this embodiment, the photocell responds a fiber optic acoustic source signal from the detection and management unit, for providing electrical photocell signals; and the acoustic transducer responds to the electrical photocell signals, for providing the transmitter acoustic signal.

The at least one transmitter may also include multiple fiber optic acoustic sources with the optical fiber having fiber Bragg Gratings therein each with a separate wavelength. Each multiple fiber optic acoustic source includes a fiber optic acoustic source having a circulation coupler optical coupler, a fiber Bragg Grating, a photocell and an acoustic transducer.

The present invention also features an acoustic logging system having a sonde for arranging in a borehole of a well, the sonde having at least one transmitter for providing at least one transmitter acoustic signal, and having receivers for responding to the at least one transmitter acoustic signal, for providing electrical receiver signals containing information about properties of earth formations in the borehole of the well. In this embodiment, the at least one transmitter comprises one or more fiber optic acoustic sources having an optical fiber with fiber Bragg Gratings. Similar to that discussed above, each fiber optic acoustic source includes a fiber optic acoustic source having a circulation coupler, a fiber Bragg Grating, a photocell and a acoustic transducer.

One important feature of the present invention is that it uses optical fiber to measure the receiver output as well as to transmit data. In operation, the electrical receiver voltage signal is transformed into an optical phase or wavelength signal and transmitted or reflected back to the detection and management unit for signal processing. The present invention eliminates the need for using extra electronics down in the borehole, greatly reduces the electronics content downhole and simplifies the overall design of the sonde tool. Because of the use of piezoelectric or magnetostrictive transducer material, the sonde tool of the present invention eliminates completely the use of downhole receiver electronics. The reduction or elimination of downhole electronics not only reduces the cost of the tool, but also improves the reliability. Moreover, the tool of the current invention can be operated under high temperature. All the measurement electronics are on the surface, which is a much friendlier environment.

In summary, the advantages of the present invention include at least the following: (1) higher data rate telemetry, (2) no downhole receiver electronics, (3) a less expensive overall sonde design, (4) a more reliable design, (5) reduced overall well logging costs, (6) enables the uses of wavelength division multiplexing (WDM) and time division multiplexing (TDM), which allows more receivers to be built into the sonde tool for more accurate acoustic measurement, and (7) multi-pole transmitters and receivers can easily be made.

DETAILED DESCRIPTION OF THE INVENTION

Figure 2:
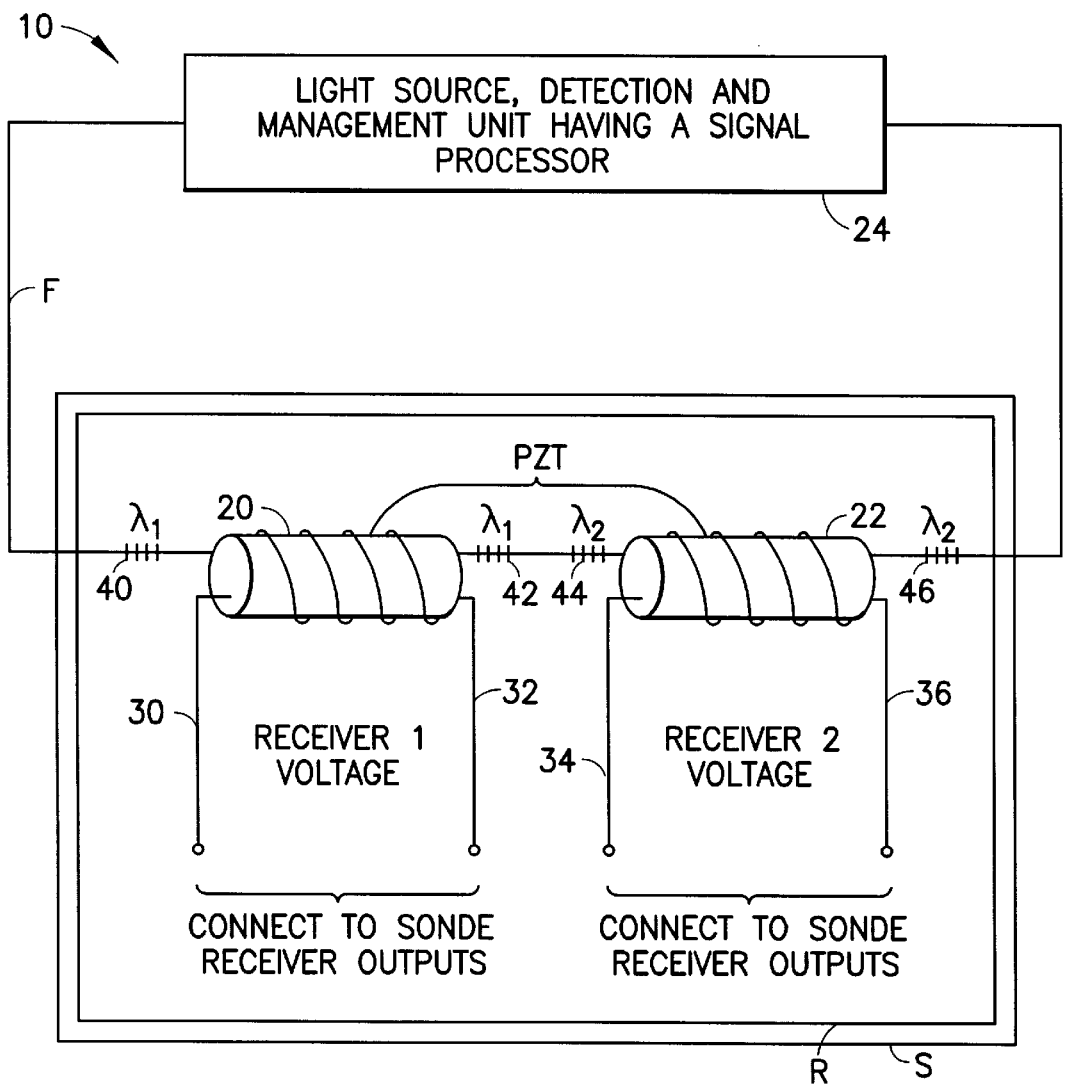
FIG. 2 is a schematic sketch of a receiver according to the present invention.

FIG. 2 shows an acoustic logging system which is the subject matter of the present invention and generally indicated as 10. The acoustic logging system features one or more transducers 20, 22, an optical fiber F, and a light source, detection and management unit 24.

Figure 1:
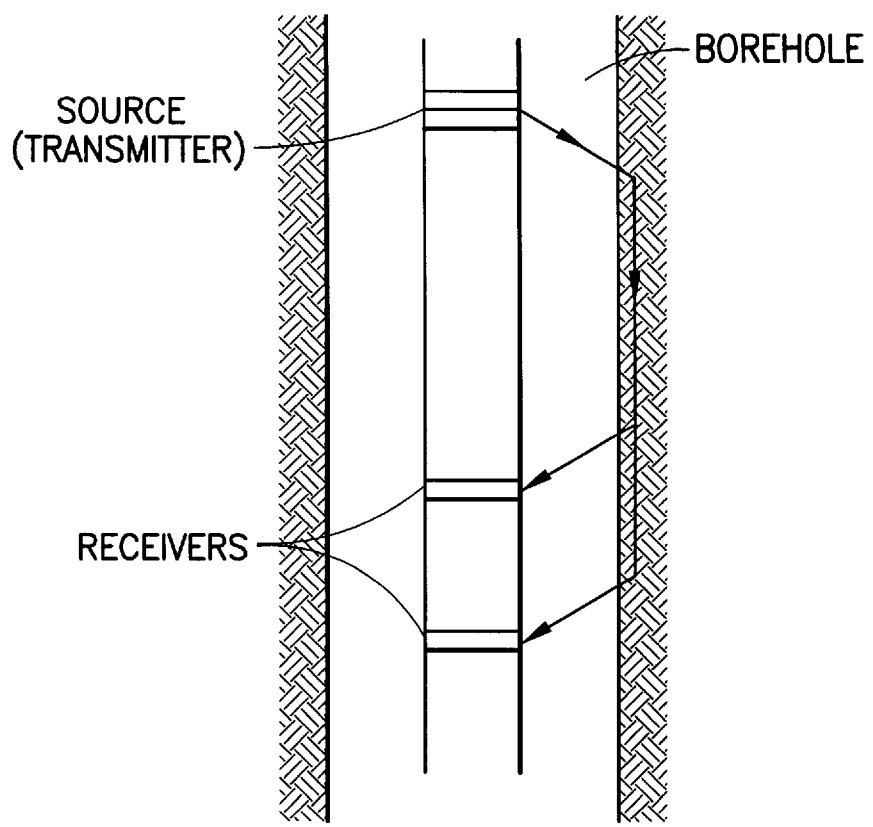
FIG. 1 is a schematic sketch of a sonic sonde that is known in the art.

The transducers 20, 22 respond to the electrical receiver signals on lines 30, 32, 34, 36 from the receiver of the sonde shown in FIG. 1, for example, for providing one or more mechanical transducer forces containing information about the electrical receiver signals. One or more of the transducer 20, 22 may be a piezoelectric or magnetostrictive transducer, which are well known in the art. The scope of the invention is not intended to be limited to any particular type or kind of transducer.

The light source, detection and management unit 24 provides an optical signal through the optical fiber F. The optical fiber F may be disposed in a wireline such as that shown and described in U.S. Pat. No. 5,495,547 that connects the light source, detection and management unit 24 to the sondes.

The optical fiber F responds to the one or more mechanical transducer forces, for changing an optical parameter or characteristic of the optical signal depending on the change in length of the optical fiber F, and providing a transduced optical signal containing information about the one or more mechanical transducer forces from the one or more transducers 20, 22. The optical fiber F is wrapped around the one or more transducers 20, 22 and affixed thereon. The optical fiber F may be affixed to the one or more transducers 20, 22 by bonding or wrapping under tension; and the scope of the invention is not intended to be limited to any particular manner of the affixing the same.

In FIG. 2, the optical fiber F is bonded to the one or more transducers 20, 22. The optical fiber F has fiber Bragg Grating pairs 40, 42; 44, 46 arranged on a part thereof not bonded to the one or more transducers 20, 22. Each transducer 20, 22 is arranged between a respective fiber Bragg Grating pair 40, 42; 44, 46. In this embodiment, a change in the length of the optical fiber F causes a change in the phase of the optical signal transmitted or reflected in the optical fiber F.

Figure 3:
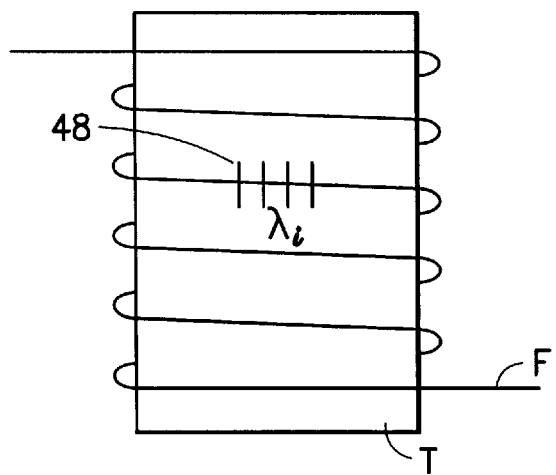
FIG. 3 is a diagram of an alternative embodiment using a coupler-based interferometer technique.

In another embodiment shown in part in FIG. 3, the optical fiber F has a fiber Bragg Grating 48 arranged on a part thereof bonded to a transducer T. In this embodiment, a change in the length of the fiber Bragg Grating 48 causes a change in the wavelength of the optical signal transmitted or reflected in the optical fiber F.

Figure 4:
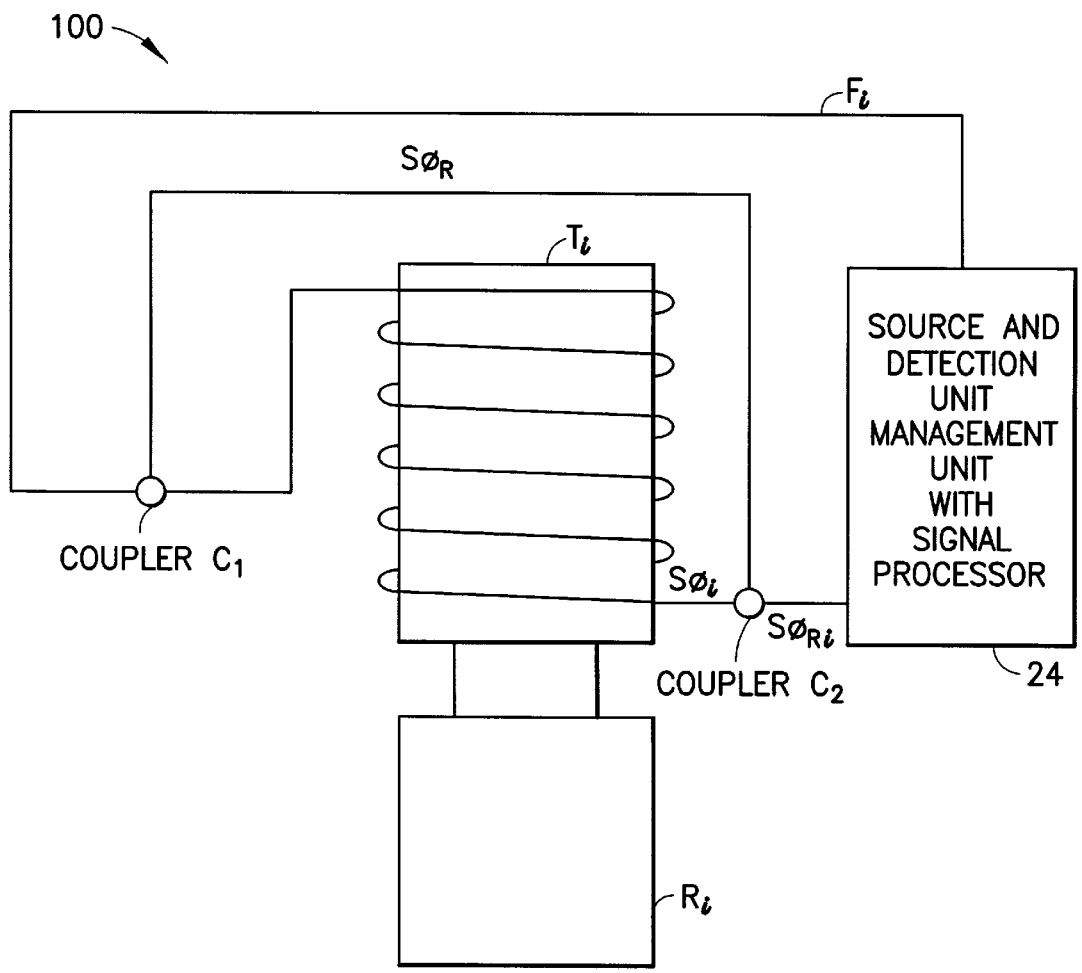
FIG. 4 is a schematic sketch of a part of an alternative embodiment of the present invention.

The acoustic logging system 10 may also include a coupler-based interferometric system shown in FIG. 4 for sensing and determining the change in the optical parameter or characteristic of the optical signal depending on the change in length of the optical fiber. This embodiment is discussed in further detail below.

In each embodiment, the change in length of the optical fiber causes a change in the phase or wavelength of the optical signal being transmitted or reflected through the optical fiber. The scope of the invention is not intended to be limited to any particular fiber Bragg Grating arrangement, or the method for sensing and detecting optical signals from the same.

The detection and management unit 24 has a signal processor, responds to the transduced optical signal, and provides a detection and management unit signal containing information about the properties of earth formations in the borehole. The detection and management unit 24 may use either a wavelength division multiplexing scheme for signal processing, a time division multiplexing scheme for signal processing or a combined wavelength and time division multiplexing scheme for signal processing.

The Fiber Bragg Gratings (FBG)

The present invention uses fiber Bragg Gratings 40, 42, 44, 46, 48, as optical converters or sensors, and are well known in the art. The scope of the invention is not intended to be limited to any particular kind or type thereof. It should be understood that any suitable fiber Bragg Grating sensor configuration may be used. For example, the fiber Bragg Gratings can be used for interferometric detection. Alternatively, the fiber Bragg Gratings may be used to form lasing elements for detection, for example by positioning an Ebrium doped length of optical fiber between a pair of fiber Bragg Gratings. It will also be understood by those skilled in the art that the present invention will work equally as well with other types of sensors.

As will be further understood by those skilled in the art, the optical signal processing equipment may operate on a principle of wave-division multiplexing (WDM) as described above wherein each fiber Bragg Grating sensor is utilized at a different wavelength or frequency band of interest. In such WDM embodiments, the fiber Bragg Grating pairs all have different wavelengths, and a broadband light source and detection unit is typically used. Alternatively, the present invention may utilize time-division multiplexing (TDM) for obtaining signals of the same wavelength from multiple independent sensors using time of flight analysis, or any other suitable means for analyzing signals returned from a plurality of fiber Bragg Grating sensors formed in a fiber optic sensor string. In such TDM embodiments, the fiber Bragg Grating pairs have the same wavelengths, and a narrowband light source and detection unit is typically used. Embodiments are also envisioned using time-division multiplexing (TDM) in combination with wave division multiplexing (WDM), wherein some fiber Bragg Grating pairs have the same wavelengths, and some fiber Bragg Grating pairs have different wavelengths.

Moreover, the scope of the invention is also not intended to be limited to only a fiber Bragg Grating.

Embodiments are envisioned using other fiber gratings that respond to optical signals, and change some optical parameter or characteristic thereof that can be subsequently sensed and/or detected.

Signal Processing Analysis

A person skilled in the art would appreciate how the optic fiber Bragg Grating sensors are used as sensor elements. The reader is generally referred to U.S. patent Ser. Nos. 08/853,762; 08/853,535; and U.S. patent application Ser. No. 08/853,402, all filed May 9, 1997, as well as U.S. patent application Ser. No. 09/016,258, filed Jan. 30, 1998, all assigned to the assignee of the present application, and hereby incorporated by reference. The scope of the invention is not intended to be limited to any particular optical signal processing technique.

As described therein, a data acquisition unit has a broadband light source or laser diode with suitable photo optic couplers. Demodulators and filtering equipment can be used to monitor the Bragg Grating wavelength shift as the grating is subjected to strain. If more than one grating is used, wave division multiplexing techniques can be utilized to discriminate the value or change in wavelength of each individual Bragg Grating.

When such a fiber grating is illuminated, it reflects a narrow band of light at a specified wavelength. However, a measurand, such as strain induced by pressure or temperature, will induce a change in the fiber grating spacing, which changes the wavelength of the light it reflects. The value (magnitude) of the measurand is directly related to the wavelength reflected by the fiber grating and can be determined by detecting the wavelength of the reflected light.

Other optical signal analysis techniques may be used with the present invention such as the necessary hardware and software to implement the optical signal diagnostic equipment disclosed in U.S. Pat. Nos. 4,996,419; 5,361,130; 5,401,956; 5,426,297; and/or 5,493,390, all of which are hereby incorporated by reference.

As is well known in the art, there are various optical signal analysis approaches which may be utilized to analyze return signals from Bragg Gratings. These approaches may be generally classified in the following four categories:

1. Direct spectroscopy utilizing conventional dispersive elements such as line gratings, prisms, etc., and a linear array of photo detector elements or a CCD array.
2. Passive optical filtering using both optics or a fiber device with wavelength-dependent transfer function, such as a WDM coupler.
3. Tracking using a tuneable filter such as, for example, a scanning Fabry-Perot filter, an acousto-optic filter such as the filter described in the above referenced U.S. Pat. No. 5,493,390, or fiber Bragg Grating based filters.
4. Interferometry utilizing well known grating-based or coupler-based scheme using fiber Bragg Grating or coupler pairs for detecting a change in phase as a function of a change in length of the optical fiber.

The particular technique utilized will vary, and may depend on the Bragg Grating wavelength shift magnitude (which depends on the sensor design) and the frequency range of the measurand to be detected. The reader is generally referred to FIGS. 4–8 of U.S. patent application Ser. No. 09/016,258, discussed above, which would be appreciated by a person skilled in the art.

Embodiments are also envisioned using time division multiplexing in which the same wavelength $\lambda_1$ is reflected from different fiber Bragg Grating pairs spaced at different locations. The reflected optical signal is processed using known time division multiplexing signal processing techniques.

The Basic Operation of the Present Invention

In FIG. 2, the receiver signal is measured using the present invention. The pressure at the piezoelectric receiver induces a voltage that is proportional to the pressure. In a conventional sonde shown in FIG. 1, this voltage is measured by the electronics within the sonde. In one embodiment of the invention, the receiver voltage is applied to a piezoelectric transducer. The diameter of the cylinder is now proportional to the voltage. The variation in cylinder diameter is monitored by the optic fiber wound around it. The stretch or contraction of the optical fiber F is measured by the interference between light beams reflected from the two fiber Bragg Gratings as shown in FIG. 2. The couplers $C_1$, $C_2$ used in the traditional interferometric technology can be used in place of one or more fiber Bragg Grating pairs 40, 42; 44, 46 shown in FIG. 2.

The properties of the piezoelectric transducer and the length of optical fiber F wound around the cylinder determine the sensitivity of the interferometric method. 1 microvolt can be measured by using 50 Meters of fiber wound on a cylinder of 2 inches in diameter and the state of art opto-electronics. Increasing the length of optical fiber F wound around the transducer can increase the voltage measurement sensitivity until the detectable change in optical path length is overwhelmingly due to the thermal noise.

A fiber Bragg Grating 48 can also be used in the optical fiber wound on the transducer as shown in FIG. 3. In this case, the center wavelength shift of the reflected light is a direct measure of the stretch of the optical fiber F.

Although the cylindrical piezoelectric is very convenient to use, rectangular or other shapes of piezoelectric can also be used to convert the voltage output of the pressure transducers into strain in the fiber.

The low-impedance output of a magnetostrictive transducer can also be measured by fiber optics. The electric current output is applied to a coil around another magnetostrictive material. The optical fiber F wound around the material is stretched or contracted according to the transducer output.

Dipole transmitters and receivers have been used in acoustic logging. A true mechanical dipole transducer has one output. Very often, multi-pole sensors are implemented using multiple monopole pressure transducers. A dipole receiver can be made of two pressure transducers. The transducer outputs are measured individually using fiber optics as described above. The difference between the two transducer measurements is that of the dipole receiver.

Figure 5:
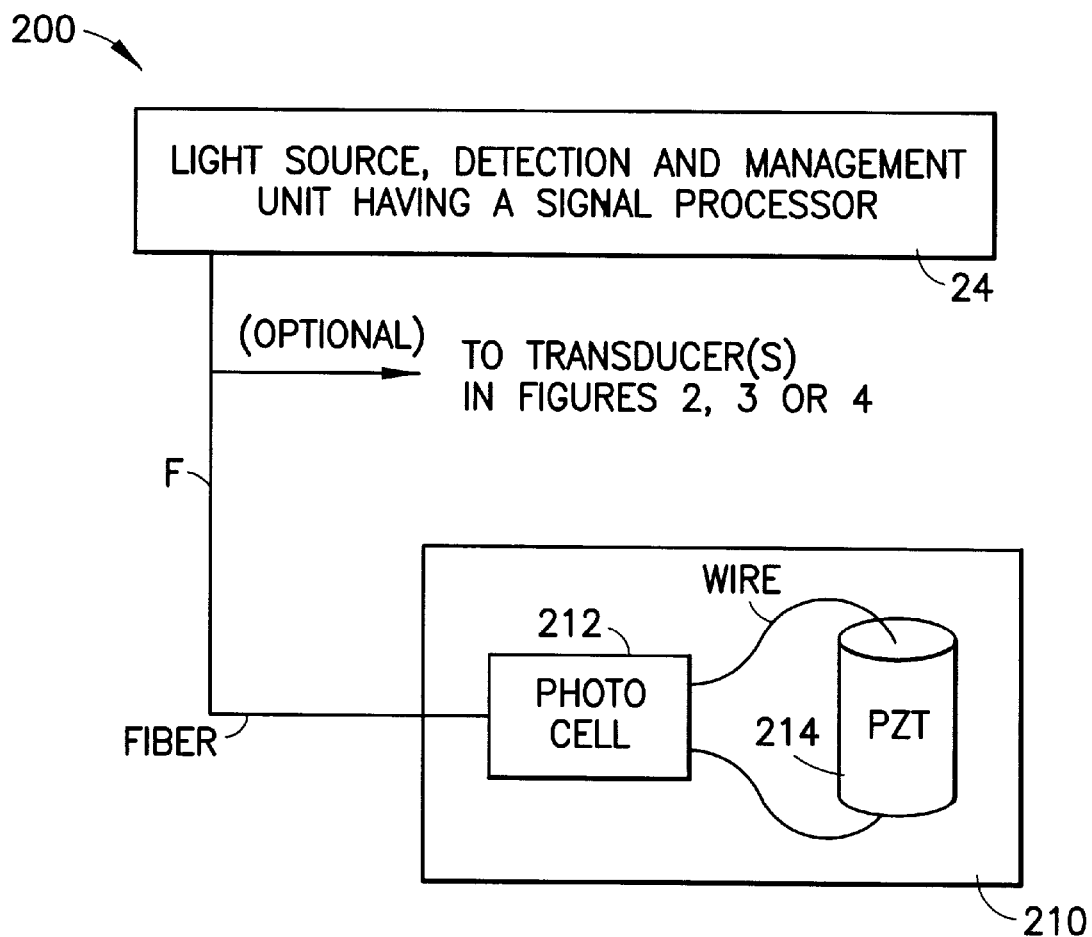
FIG. 5 is a schematic sketch of a fiber optic acoustic source according to the present invention.
Figure 6:
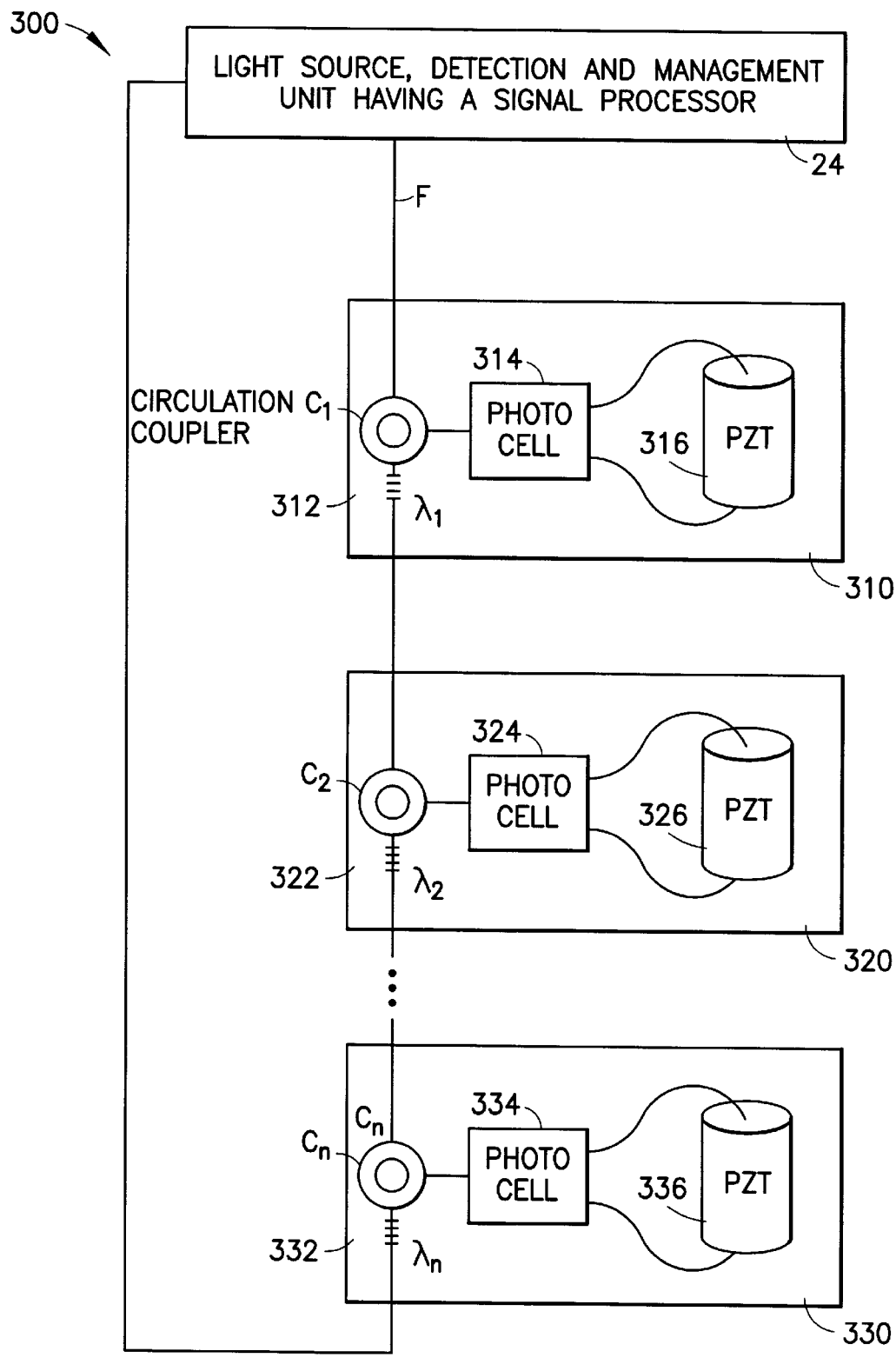
FIG. 6 is a schematic sketch of a multiple acoustic source on a single fiber according to the present invention.

The designs described above may use the existing transmitter design in the sonde shown in FIG. 1, or the new transmitter designs shown in FIGS. 5 and 6. When fiber optics is used to measure voltage output of the transducers, the sophisticated and temperature sensitive electronics is removed from the well. One advantage of using this design is that one can use the qualified and proven transducers and other sonde hardware. This design can be quickly implemented and accepted by the industry.

Coupler-based Interferometer Seismic Sensing System

FIG. 4 shows the coupler-based interferometer system generally indicated as 100, which includes a light source, detection and measurement unit 24, a fiber $F_1$, a coupler $C_1$, a transducer $T_i$, a receiver $R_i$ from a sonde similar to that shown in FIG. 1, a coupler $C_2$ and a light source, detection and measurement unit 24. In this embodiment fiber Bragg Gratings are not used.

Instead, the light source and detection unit 24 provides an optical signal on the optical fiber $F_i$ to the coupler $C_1$, which splits the optical signal into two optical signals, one of which is labelled $S\phi_R$ having a reference phase $\phi_R$. The receiver $R_i$ responds to an acoustic disturbance, for providing a receiver signal containing information about the acoustic disturbance. The transducer $T_i$ responds to the receiver signal, for providing a transducer force containing information about the receiver signal. The optical fiber $F_i$ wrapped around the transducer $T_i$ responds to the transducer force, changes the phase of the other optical signal depending on the change in length of the fiber $F_i$, for providing a transduced optical signal $S\phi_i$ having a transduced phase $\phi_i$ containing information about the transducer force. The coupler $C_2$ combines the optical signal $S\phi_R$ having the reference phase $\phi_R$ and the transduced optical signal $S\phi_i$ having the transduced phase $\phi_i$, for providing a coupler optical signal $S\phi_{Ri}$.

In operation, the optical signal $S\phi_R$ and the transduced optical signal $S\phi_i$ interfere with one another. The measurement unit 140 processes the coupler optical signal $S\phi_{Ri}$ using very well known interferometer signal processing techniques, which are described in one or more of the patents incorporated by reference herein. Moreover, as discussed above, the light source and detection unit 24 is a complete data logging system; and the scope of the invention is not intended to be limited to any particular way for detecting, measuring and logging acoustic waves based on the data contained in the coupler optical signal $S\phi_{Ri}$. Other coupler-based interferometer sensing embodiments are also known in the art.

Fiber Optic Acoustic Source

FIG. 5 shows a part of an embodiment generally indicated as 200 having at least one transmitter 210 of a sonde (not shown in detail) that is a fiber optic acoustic source having a photocell 212 and an acoustic transducer 214. The photocell 212 responds a fiber optic acoustic source signal from the detection and management unit 24, for providing electrical photocell signals; and the acoustic transducer 214 responds to the electrical photocell signals, for providing at least one transmitter acoustic signal. In operation, the light pulses are fed into the photocell 212. The photocell powers the transducer 214. The photocell 212 and acoustic transducer 214 are known in the art; and the scope of the invention is not intended to be limited to any particular kind or type thereof. The transducer 214 may be a piezoelectric or magnetostrictive transducer.

The embodiment 200 in FIG. 5 may be used alone or in combination with one or more of the embodiments shown in FIGS. 2, 3 or 4. For example, in combination, the transmitter 210 would be substituted for one or more transmitters of the sonde shown in FIG. 1, and used in combination with the embodiments shown in FIGS. 2, 3 or 4. Embodiments are envisioned in which a single optical fiber connects the detection and management unit 24 to the embodiment in FIG. 1 and one of the embodiments shown in FIGS. 2, 3 or 4, or two single optical fiber separately connects the detection and management unit 24 to the embodiment in FIG. 1 and one of the embodiments shown in FIGS. 2, 3 or 4.

Multiple Fiber Optic Acoustic Source

FIG. 6 shows a part of an embodiment generally indicated as 300 having transmitters 310, 320, 330 that are multiple fiber optic acoustic sources having an optical fiber F with fiber Bragg Gratings 312, 322, 332 therein each with a respective wavelength $\lambda_1, \lambda_2, \ldots \lambda_n$. Each multiple fiber optic acoustic source 310, 320, 330 includes a circulation coupler optical coupler $C_1, C_2, \ldots, C_n$, a fiber Bragg Grating 312, 322, 332, a photocell 314, 324, 334 and an acoustic transducer 316, 326, 336.

Each circulation coupler $C_1, C_2, \ldots, C_n$ respectively combines with a respective fiber Bragg Grating 312, 322, 332, for responding to a respective fiber optic acoustic source signal from the detection and management unit 24, for providing a respective circulation coupler fiber Bragg Grating acoustic source optical signal. Each photocell 314, 324, 334 respectively responds to the respective circulation coupler fiber Bragg Grating acoustic source optical signal, for providing respective electrical photocell signals. Each acoustic transducer 316, 326, 336 respectively responds to the respective electrical photocell signals, for providing a respective acoustic transducer signal as the transmitter acoustic signal.

Similar to that discussed above in relation to FIG. 5, the embodiment 300 in FIG. 6 may be used alone or in combination with one or more of the embodiments shown in FIGS. 2, 3 or 4.

In operation, a single strand of single-mode fiber is being used to drive multiple acoustic sources. FIG. 6 shows a design using three-way circulation couplers. The circulation coupler passes the light from one input almost entirely to the next port. Strongly reflective gratings are used to selectively reflect light to power the photocell. The light reflected from a grating section is passed through the coupler to the fiber linked to the photocell. The source i is activated by light of wavelength $\lambda_1$.

In FIG. 6, light energy transmitted through the single mode fiber is used to directly drive the PZT transducer. The maximum power output is about 1 Watt that is the upper limit on how much light energy can be fed into a single mode fiber. In noisy logging environment, bigger acoustic sources may be required. The design in FIG. 6 could be modified.

Fiber Optic Transducers

Figure 7:
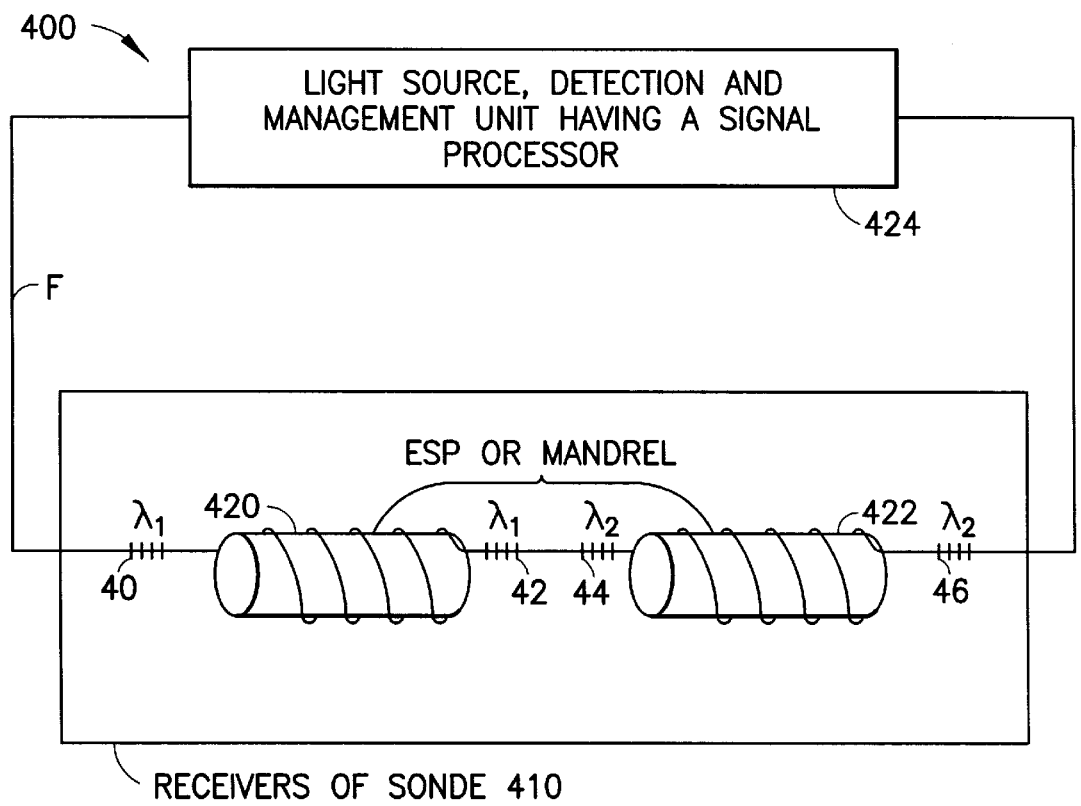
FIG. 7 is a schematic of an embodiment of an acoustic logging system having a sonde with a new type of receiver.

FIG. 7 shows an acoustic logging system generally indicated as 400 having receivers generally indicated as 410 of a sonde (FIG. 1), a light source 424, an optical fiber F, and a detection and management unit 424. The light source 424 and detection and management unit 424 are shown as one unit in FIG. 7.

In this embodiment, the receivers 410 are opto-mechanical transducers 420, 422 that respond to an acoustic transmitter force such as a pressure, for providing mechanical transducer forces containing information about properties of earth formations in a borehole. The opto-mechanical transducer may be a fiber-wrapped mandrel, or other known material such as that used in an electrical submersible pump monitoring system.

The light source 424 provides an optical signal to the optical fiber F.

The optical fiber F responds to the mechanical transducer forces, for changing an optical parameter or characteristic of the optical signal depending on the change in length of the optical fiber, and providing a transduced optical signal containing information about the mechanical transducer forces. The optical fiber F is wrapped around the opto-mechanical transducers 420, 422 and bonded thereon. As shown in FIG. 7, the optical fiber F have fiber Bragg Grating pairs 40, 42; 44, 46 similar to that shown in FIG. 2 arranged on a part thereof not bonded to the opto-mechanical transducers 420, 422 and arranged between a respective fiber Bragg Grating pair. The optical fiber F may also have a fiber Bragg Grating arranged on a part thereof and bonded to an opto-mechanical transducer 420, 422 similar to that shown in FIG. 3.

The detection and management unit 424 has a signal processor, responds to the transduced optical signal, for providing a detection and management unit signal containing information about the properties of earth formations in the borehole.

In this embodiment, the sonde (FIG. 1) also has a transmitter (FIG. 1) for providing the acoustic transmitter force.

In the above design, the acoustic pressure signal is converted into a mechanical strain in the cylinder. The mechanical strain is translated into an optical signal.

Fiber optic pressure transducers can be used in an acoustic tool to sense the acoustic pressure signal directly. A pressure transducer used in the ESP monitoring systems or mandrel hydrophone are examples of transducers that can be used in acoustic tools. Fiber Bragg Gratings without extra amplifying mechanisms can also be used. An acoustic tool (i.e. sonde) built using fiber optic transducers are simpler and potentially more reliable.

Method for Acoustic Recording of Information about an Object

The present invention also features a method for acoustic recording of information about an object.

The method includes the steps of: (1) moving a receiver that responds to acoustic waves from a transmitter for sensing information about an object; (2) providing from the receiver electrical receiver signals containing information about the acoustic waves; (3) responding with a transducer to the electrical receiver signals from the receiver, for providing a mechanical transducer force containing information about the electrical receiver signals; (4) providing an optical signal from an light source; (5) responding with an optical fiber to the mechanical transducer force, for changing an optical parameter or characteristic of the optical signal depending on the change in length of the optical fiber, and providing a transduced optical signal containing information about the mechanical transducer force from the transducer; and (6) detecting and managing with a detection and management unit having a signal processor that responds to the transduced optical signal, for providing a signal processor signal containing information about the acoustic recording of the object.

SCOPE OF THE INVENTION

Although the invention has been described and illustrated with respect to exemplary embodiments thereof, the foregoing and various other additions and omissions may be made therein and thereto without departing from the spirit and scope of the present invention.

I claim:

1. An acoustic logging system having a sonde for arranging in a borehole of a well, including an oil well, the sonde having at least one transmitter for providing at least one transmitter acoustic signal, and having receivers for responding to the at least one transmitter acoustic signal, for providing electrical receiver signals containing information about properties of earth formations in the borehole, the acoustic logging system comprising:

one or more transducers arranged in the receiver of the sonde, responsive to the electrical receiver signals, for providing one or more mechanical transducer forces containing information about the electrical receiver signals;

a light source for providing an optical signal;

an optical fiber, responsive to the one or more mechanical transducer forces, for changing an optical parameter or characteristic of the optical signal depending on the change in length of the optical fiber in the sonde, and providing a transduced optical signal containing information about the one or more mechanical transducer forces from the one or more transducers; and a detection and management unit having a signal processor, responsive to the transduced optical signal, for providing a detection and management unit signal containing information about the properties of the earth formations in the borehole.

2. An acoustic logging system according to claim 1, wherein at least one transducer is a piezoelectric or magnetostrictive transducer.

3. An acoustic logging system according to claim 1, wherein the optical fiber is wrapped around the one or more transducers and affixed thereon.

4. An acoustic logging system according to claim 1,
wherein the optical fiber is bonded to the one or more transducers and affixed thereon;
wherein the optical fiber has fiber Bragg Grating pairs arranged on a part thereof not bonded to the one or more transducers; and
wherein each transducer is arranged between a respective fiber Bragg Grating pair.

5. An acoustic logging system according to claim 1, wherein the optical fiber has a fiber Bragg Grating arranged on a part thereof and bonded to a transducer.

6. An acoustic logging system according to claim 1, wherein the acoustic logging system further comprises a coupler-based interferometric system for sensing and determining the change in the optical parameter or characteristic of the optical signal depending on the change in length of the optical fiber.

7. An acoustic logging system according to claim 1, wherein the change in length of the optical fiber causes a change in the phase or wavelength of the optical signal being transmitted or reflected through the optical fiber.

8. An acoustic logging system according to claim 1, wherein the detection and management unit uses a wavelength division multiplexing scheme for signal processing.

9. An acoustic logging system according to claim 1, wherein the detection and management unit uses a time division multiplexing scheme for signal processing.

10. An acoustic logging system according to claim 1, wherein the detection and management unit uses a combination of a wavelength division multiplexing and time division multiplexing scheme for signal processing.

11. An acoustic logging system according to claim 1, wherein the at least one transmitter of the sonde is a fiber optic acoustic source having a photocell and an acoustic transducer.

12. An acoustic logging system according to claim 11,
wherein the photocell responds to a fiber optic acoustic source signal from the detection and management unit, for providing electrical photocell signals; and
wherein the acoustic transducer responds to the electrical photocell signals, for providing the at least one transmitter acoustic signal.

13. An acoustic logging system according to claim 1, wherein the at least one transmitter includes multiple fiber optic acoustic sources; and
wherein the optical fiber has fiber Bragg Gratings therein each with a respective wavelength.

14. An acoustic logging system according to claim 13, wherein each multiple fiber optic acoustic source includes a respective fiber optic acoustic source having a respective optical coupler, a respective fiber Bragg Grating, a respective photocell and a respective acoustic transducer.

15. An acoustic logging system according to claim 14,
wherein the respective optical coupler is a circulation coupler that combines with the respective fiber Bragg Grating for responding to a respective fiber optic acoustic source signal, for providing a respective circulation coupler fiber Bragg Grating acoustic source optical signal;
wherein the respective photocell responds to the respective circulation coupler fiber Bragg Grating acoustic source optical signal, for providing respective electrical photocell signals; and
wherein the respective acoustic transducer responds to the respective electrical photocell signals, for providing a respective acoustic transducer signal as the transmitter acoustic signal.

16. An acoustic logging system having a sonde for arranging in a borehole of a well, including an oil well, the sonde having at least one transmitter for providing at least one transmitter acoustic signal, and having receivers for responding to the at least one transmitter acoustic signal, for providing electrical receiver signals containing information about properties of earth formations in the borehole,
characterized in that the at least one transmitter further comprises one or more fiber optic acoustic sources having an optical fiber with fiber Bragg Gratings.

17. An acoustic logging system according to claim 16, wherein each fiber optic acoustic source includes a respective fiber optic acoustic source having a respective optical coupler, a respective fiber Bragg Grating, a respective photocell and a respective acoustic transducer.

18. An acoustic logging system according to claim 17,
wherein the respective optical coupler is a circulation coupler that combines with the respective fiber Bragg Grating having a respective wavelength, for responding to a respective fiber optic acoustic source signal, for providing a respective circulation coupler fiber Bragg Grating acoustic source optical signal;
wherein the respective photocell responds to the respective circulation coupler fiber Bragg Grating acoustic source optical signal, for providing respective electrical photocell signals; and
wherein the respective acoustic transducer responds to the respective electrical photocell signals, for providing a respective acoustic transducer signal as the at least one transmitter acoustic signal.

19. An acoustic logging system according to claim 16, wherein the acoustic logging system further comprises:
one or more transducers, responsive to the electrical receiver signals, for providing one or more mechanical transducer forces containing information about the electrical receiver signals;
a light source for providing an optical signal;
an optical fiber, responsive to the one or more mechanical transducer forces, for changing an optical parameter or characteristic of the optical signal depending on the change in length of the optical fiber, and providing a transduced optical signal containing information about the one or more mechanical transducer forces from the transducers; and a detection and management unit having a signal processor means, responsive to the transduced optical signal, for providing a signal processor signal containing information about earth formations in the borehole.

20. An acoustic logging system comprising:

acoustic transmitter means including multiple fiber optic acoustic sources having an optical fiber with fiber Bragg Gratings therein each with a separate wavelength;

each multiple fiber optic acoustic source having a respective fiber optic acoustic source with a respective circulation coupler, a respective fiber Bragg Grating, a respective photocell and a respective acoustic transducer;

each circulation coupler and fiber Bragg Grating combining to respond to a respective fiber optic acoustic source signal, for providing a respective circulation coupler fiber Bragg Grating acoustic source optical signal;

each photocell responding to the respective circulation coupler fiber Bragg Grating acoustic source optical signal, for providing respective electrical photocell signals; and each acoustic transducer responding to the respective electrical photocell signals, for providing a respective acoustic transducer signal to be sensed by one or more receivers in the acoustic logging system.

21. A method for acoustic recording of information about an object, comprising the steps of:

moving a sonde having a transmitter and a receiver in relation to a borehole of an oil well:

transmitting an acoustic signal with the transmitter;

responding with the receiver to acoustic waves from the transmitter for sensing information about an object;

providing from the receiver electrical receiver signals containing information about the acoustic waves;

responding with a transducer to the electrical receiver signals from the receiver, for providing a mechanical transducer force containing information about the electrical receiver signals;

providing an optical signal from an light source;

responding with an optical fiber to the mechanical transducer force, for changing an optical parameter or characteristic of the optical signal depending on the change in length of the optical fiber, and providing a transduced optical signal containing information about the mechanical transducer force from the transducer; and detecting and managing with a detection and management unit having a signal processor that responds to the transduced optical signal, for providing a signal processor signal containing information about the acoustic recording of the object.

22. An acoustic logging system having a sonde for arranging in a borehole of a well, including an oil well, the sonde having at least one transmitter for providing at least one transmitter acoustic signal, and having receivers for responding to the at least one transmitter acoustic signal, for providing acoustic receiver signals containing information about properties of earth formations in the borehole, the acoustic logging system comprising:

a transducer arranged in the receiver of the sonde, responsive to the acoustic receiver signals, for providing a mechanical transducer force containing information about the electrical receiver signals;

a light source for providing an optical signal;

an optical fiber, responsive to the mechanical transducer force, for changing an optical parameter or characteristic of the optical signal depending on the change in length of the optical fiber in the sonde, and providing a transduced optical signal containing information about the mechanical transducer force; and a detection and management unit having a signal processor, responsive to the transduced optical signal, for providing a detection and management unit signal containing information about the properties of earth formations in the borehole.

23. An acoustic logging system according to claim 1, wherein a part of the optical fiber is disposed in a wireline connecting the detection and management unit and the sonde.

24. An acoustic logging system having a sonde for arranging in a borehole of a well, including an oil well, the sonde having at least one transmitter for providing at least one transmitter acoustic signal, comprising:

receivers arranged in the sonde that are opto-mechanical transducers, responsive to an acoustic transmitter force such as a pressure, for providing mechanical transducer forces containing information about properties of earth formations in a borehole;

a light source for providing an optical signal;

an optical fiber, responsive to the mechanical transducer forces, for changing an optical parameter or characteristic of the optical signal depending on the change in length of the optical fiber in the sonde, and providing a transduced optical signal containing information about the mechanical transducer forces; and a detection and management unit having a signal processor, responsive to the transduced optical signal, for providing a detection and management unit signal containing information about the properties of earth formations in the borehole.

25. An acoustic logging system according to claim 24, wherein at least one opto-mechanical transducer is a mandrel.

26. An acoustic logging system according to claim 24, wherein the optical fiber is wrapped around the opto-mechanical transducers and bonded thereon.

27. An acoustic logging system according to claim 24, wherein the optical fiber has fiber Bragg Grating pairs arranged on a part thereof not bonded to the opto-mechanical transducers; and wherein each opto-mechanical transducer is arranged between a respective fiber Bragg Grating pair.

28. An acoustic logging system according to claim 24, wherein the optical fiber has a fiber Bragg Grating arranged on a part thereof and bonded to an opto-mechanical transducer.

29. An acoustic logging system according to claim 3, wherein the optical fiber is bonded to the one or more transducers.

30. An acoustic logging system according to claim 3, wherein the optical fiber is wrapped under tension on the one or more transducers.

* * * * *

UNITED STATES PATENT AND TRADEMARK OFFICE
CERTIFICATE OF CORRECTION

PATENT NO : 6,137,621
DATED : October 24, 2000
INVENTOR(S): Jian-Qun Wu

It is certified that error appears in the above-identified patent and that said Letters Patent are hereby corrected as shown below:

Title page, add item [72] Assignee: CiDRA Corporation, Wallingford, Conn.

At column 8, line 1, delete "$F_1$" and insert --$F_1$--.

At column 13, line 32, (claim 21, line 4), delete "well:" and insert "well;".

Signed and Sealed this

Twenty-second Day of May, 2001

NICHOLAS P. GODICI

*Attest:*

*Attesting Officer*    Acting Director of the United States Patent and Trademark Office